US012602241B2

(12) United States Patent
Yomo

(10) Patent No.: US 12,602,241 B2
(45) Date of Patent: Apr. 14, 2026

(54) SECURE NETWORKING ENGINE FOR A TECHNICAL SUPPORT MANAGEMENT SYSTEM

(71) Applicant: Microsoft Technology Licensing, LLC, Redmond, WA (US)

(72) Inventor: Takashi Yomo, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 671 days.

(21) Appl. No.: 17/984,943

(22) Filed: Nov. 10, 2022

(65) Prior Publication Data

US 2024/0012672 A1 Jan. 11, 2024

Related U.S. Application Data

(60) Provisional application No. 63/358,797, filed on Jul. 6, 2022.

(51) Int. Cl.
*H04L 9/40* (2022.01)
*G06F 9/455* (2018.01)

(52) U.S. Cl.
CPC ...... *G06F 9/45558* (2013.01); *H04L 63/0272* (2013.01); *H04L 63/0281* (2013.01); *G06F 2009/45595* (2013.01)

(58) Field of Classification Search
CPC ....... G06F 9/45558; G06F 2009/45595; G06F 11/366; G06F 11/3698; G06F 2009/45587;
(Continued)

(56) References Cited

U.S. PATENT DOCUMENTS

| 2015/0193637 | A1* | 7/2015 | Booth | ..................... G06F 21/53 |
| | | | | 726/30 |
| 2016/0162322 | A1* | 6/2016 | Wu | ..................... G06F 9/45558 |
| | | | | 717/125 |

(Continued)

FOREIGN PATENT DOCUMENTS

| WO | 2019164907 A1 | 8/2019 |
| WO | 2022093237 A1 | 5/2022 |

OTHER PUBLICATIONS

Bender, et al., "Azure Network Round-Trip Latency Statistics", Retrieved From: https://learn.microsoft.com/en-us/azure/networking/azure-network-latency, Jul. 25, 2022, 2 Pages.

(Continued)

*Primary Examiner* — Kenneth Tang
(74) *Attorney, Agent, or Firm* — Shook, Hardy & Bacon L.L.P.

(57) ABSTRACT

Methods, systems, and computer storage media for providing a virtual diagnostic system in a secure networking engine of a technical support management system. The virtual diagnostic system provides a secure networking connection and diagnostic and debugging services between a cloud provider computing environment and a customer computing environment. The virtual diagnostic system includes a virtual lab VM network, a private VPN service, and virtual diagnostic system machines. The virtual lab virtual machine network operates in an instance of the secure network engine at the secure networking engine site. In operation, a request to instantiate a secure networking engine is accessed. The request comprises location parameters of the diagnostic target. Based on the location parameters of the diagnostic target, a secure networking engine site for instantiating the secure networking engine is determined. The secure networking engine—associated with a cloud (Continued)

provider computing environment—is instantiated at the secure networking engine site.

20 Claims, 14 Drawing Sheets

(58) Field of Classification Search
CPC ....... G06F 2009/45591; H04L 63/0272; H04L 63/0281; H04L 63/0428; H04L 63/10; H04L 63/107; H04L 67/131; H04L 67/1396; H04L 67/52
See application file for complete search history.

(56) References Cited

U.S. PATENT DOCUMENTS

| 2016/0285831 | A1* | 9/2016 | Doane | H04L 61/5069 |
| 2017/0180324 | A1* | 6/2017 | Hill | H04L 63/0281 |
| 2017/0302535 | A1* | 10/2017 | Lee | H04L 41/26 |
| 2017/0324566 | A1* | 11/2017 | Kawasaki | H04L 9/006 |
| 2019/0246240 | A1* | 8/2019 | Koohmarey | H04L 63/0281 |
| 2020/0145299 | A1* | 5/2020 | Do | H04L 41/082 |
| 2020/0244702 | A1* | 7/2020 | Ambardekar | H04L 63/0236 |
| 2021/0297417 | A1 | 9/2021 | Pogrebinsky | |
| 2022/0029964 | A1* | 1/2022 | Kakumanu | H04L 41/0806 |
| 2022/0272163 | A1* | 8/2022 | Schuller | H04L 67/51 |
| 2022/0278889 | A1* | 9/2022 | Malleshaiah | H04L 67/51 |
| 2023/0281069 | A1* | 9/2023 | Goska | G06F 11/3006 714/37 |
| 2024/0056507 | A1* | 2/2024 | Schuller | H04L 67/34 |
| 2024/0129280 | A1* | 4/2024 | Potlapally | H04L 63/0464 |

OTHER PUBLICATIONS

"International Search Report and Written Opinion Issued in PCT Application No. PCT/US23/024629", Mailed Date: Sep. 19, 2023, 19 Pages.

* cited by examiner

100

110

SECURE NETWORKING ENGINE

VIRTUAL DIAGNOSTIC SYSTEM
110A

HOST NETWORK
120

SECURE NETWORKING ENGINE NETWORK
130

PRIVATE LAB CONTROL MACHINE
140

DEBUGGER HOST MACHINE
150

DEBUGGER PROXY MACHINE
160

PRIVATE VPN SERVICE
110B

NETWORK
190

CLOUD PROVIDER COMPUTING ENVIRONMENT
170

SECURE NETWORKING ENGINE MANAGER
110C

CUSTOMER COMPUTING ENVIRONMENT
180

SECURE NETWORKING ENGINE DIAGNOSTIC TARGET MANAGER
110D

FIG. 1A

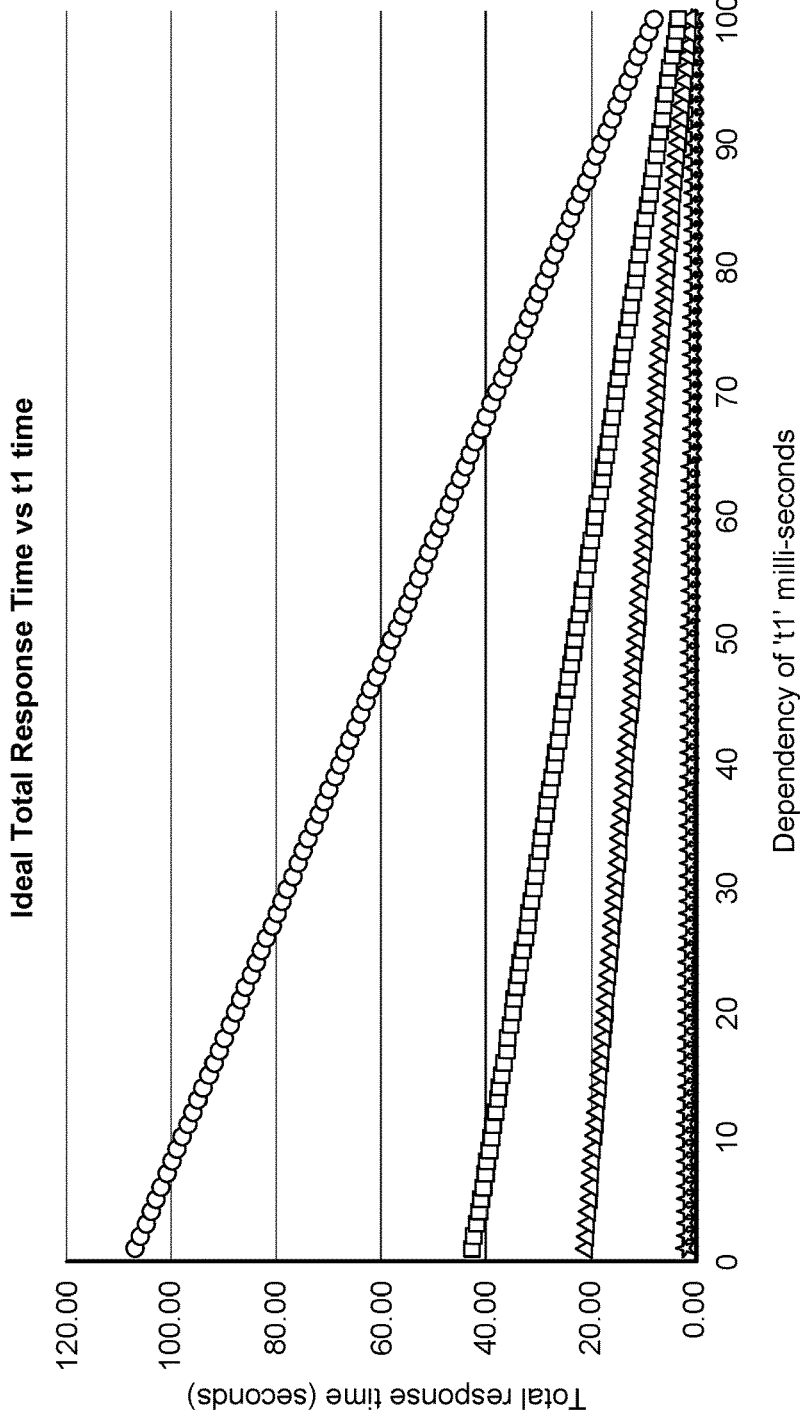
FIG. 1F

300

302—  ACCESS A REQUEST TO INSTANTIATE A SECURE
NETWORKING ENGINE SITE FOR PROVIDING
TECHNICAL SUPPORT SERVICES FOR A
DIAGNOSTIC TARGET

304—  INSTANTIATE THE SECURE NETWORKING
ENGINE COMPRISING A PRIVATE LAB CONTROL
MACHINE, A DEBUGGER HOST MACHINE, AND A
DEBUGGER PROXY MACHINE

306—  ESTABLISH A SECURE NETWORKING
CONNECTION TO THE DIAGNOSTIC TARGET

400

402 — ACCESS LOCATION PARAMETERS OF A DIAGNOSTIC TARGET

404 — BASED ON THE LOCATION PARAMETERS, IDENTIFY A SECURE NETWORKING ENGINE SITE FOR PROVIDING TECHNICAL SUPPORT SERVICES FOR THE DIAGNOSTIC TARGET

406 — CAUSE INSTANTIATION OF A SECURE NETWORKING ENGINE ON THE SECURE NETWORKING ENGINE SITE

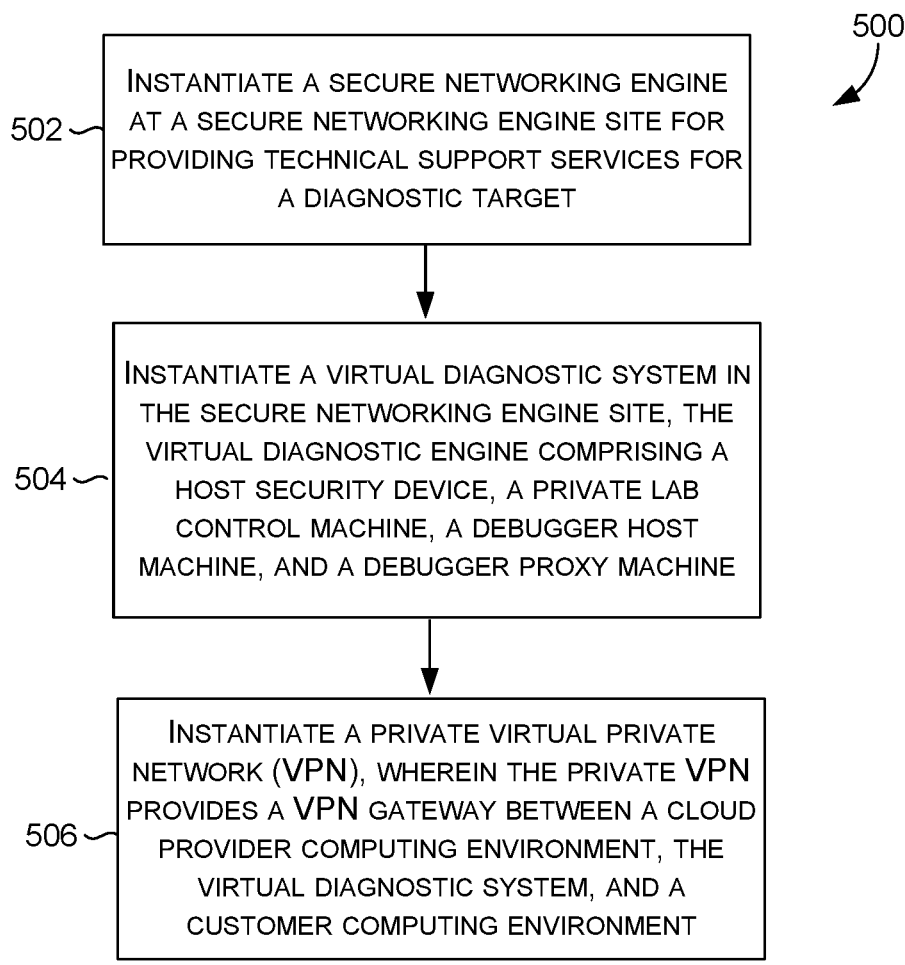

502 ⌇ INSTANTIATE A SECURE NETWORKING ENGINE AT A SECURE NETWORKING ENGINE SITE FOR PROVIDING TECHNICAL SUPPORT SERVICES FOR A DIAGNOSTIC TARGET

504 ⌇ INSTANTIATE A VIRTUAL DIAGNOSTIC SYSTEM IN THE SECURE NETWORKING ENGINE SITE, THE VIRTUAL DIAGNOSTIC ENGINE COMPRISING A HOST SECURITY DEVICE, A PRIVATE LAB CONTROL MACHINE, A DEBUGGER HOST MACHINE, AND A DEBUGGER PROXY MACHINE

506 ⌇ INSTANTIATE A PRIVATE VIRTUAL PRIVATE NETWORK (VPN), WHEREIN THE PRIVATE VPN PROVIDES A VPN GATEWAY BETWEEN A CLOUD PROVIDER COMPUTING ENVIRONMENT, THE VIRTUAL DIAGNOSTIC SYSTEM, AND A CUSTOMER COMPUTING ENVIRONMENT

CLIENT DEVICE
680

FABRIC
CONTROLLER
640

HOST
650

VIRTUAL
MACHINE
652

VIRTUAL
MACHINE
654

NODE 630

RESOURCES
660

RACK 620

CLOUD COMPUTING PLATFORM 610

SECURE NETWORKING ENGINE FOR A TECHNICAL SUPPORT MANAGEMENT SYSTEM

CROSS-REFERENCE TO RELATED APPLICATIONS

This application claims the benefit of U.S. Provisional Application No. 63/358,797, filed on Jul. 6, 2022, the entire contents of which are hereby incorporated by reference in their entirety.

BACKGROUND

Users rely on networked communications between applications and services to accomplish computing tasks. Distributed computing systems host and support different types of applications and services in on-premise networks or wide-area networks (WAN). In particular, the distributed computing system provider (e.g., a cloud computing service provider) can implement a technical support management system—with remote access to a customer computing environment—to provide diagnostic and debugging services. A diagnostic and debugging tool of the technical support management system can support finding and resolving errors in a customer computing environment. For example, a debugger can be used to debug user mode applications, device drivers, and an operating system in kernel model.

Conventionally, technical support management systems are not configured with a comprehensive computing logic and infrastructure to efficiently provide adequate secure network communications between a cloud provider computing environment and a customer computing environment. Such systems may operate with an infrastructure that is limited by latency in communications between the customer and cloud provider computing environments. Moreover, both the customer and the cloud provider may have concerns about exposing their confidential information if a secure networking connection between them is not configured to secure this type of confidential information. As such, a more comprehensive technical support management system—with an alternative basis for performing secure networking operations—can improve computing operations and interfaces in technical support management systems.

SUMMARY

Various aspects of the technology described herein are generally directed to systems, methods, and computer storage media for, among other things, providing a virtual diagnostic system in a secure networking engine of a technical support management system. The virtual diagnostic system—in a dynamically identified secure networking engine site—provides a secure networking connection and diagnostic and debugging services between a cloud provider computing environment and a customer computing environment. The virtual diagnostic system includes a virtual lab virtual machine network and virtual diagnostic system machines (i.e., a private lab control machine; a debugger host machine; and a debugger proxy machine). The virtual lab virtual machine network (e.g., virtual lab VM subnet) operates in an instance of the secure network engine at the secure networking engine site.

Conventionally, technical support management systems are not configured with a comprehensive computing logic and infrastructure to efficiently provide adequate secure network communications for technical support services of a cloud provider. For example, offline debugging using memory snapshots introduces latency issues associated with copying data from a customer computing environment to a cloud provider computing environment. Live debugging via customer-provided network connections or cloud-provided network connections raise security concerns—on the cloud provider side and the customer side, respectively,—about potential exposing their confidential information. Other types of considerations (e.g., data boundary, administrative overhead, and external bad actors) are also implicated with network connections that are not specifically developed and configured with the above-described limitations in mind. A technical solution—to the limitations of conventional technical support management systems—includes virtual lab VM network associated with a secure networking engine that provides virtual diagnostic system in a technical support management system.

In operation, a request to instantiate a secure networking engine—for providing technical support services of a cloud provider computing environment for a diagnostic target of a customer computing environment—is accessed. The request comprises location parameters of the diagnostic target. Based on the location parameters of the diagnostic target, a secure networking engine site for instantiating the secure networking engine is determined. A secure networking engine—associated with a cloud provider computing environment—is instantiated at the secure networking engine site.

The secure networking engine can be dynamically instantiated at the secure networking engine site. The secure networking engine comprises a virtual diagnostic system (e.g., virtual lab VM subnet) comprising a host security device, a private lab control machine, a debugger host machine, and a debugger proxy machine. The secure networking engine further comprises a private virtual private network (VPN) that provides a VPN gateway between the cloud provider computing environment, the virtual diagnostic system, and the customer computing environment.

It is contemplated that a secure networking engine manager of the cloud provider computing environment operates to access the request to instantiate the secure networking engine at the secure networking engine site, the secure networking engine site provides technical support services for a diagnostic target at a customer computing environment. Based on accessing the request, the secure networking engine—comprising a private lab control machine, a debugger host machine, and a debugger proxy machine—is instantiated. A secure networking engine manager causes establishment of a secure networking connection via the private VPN, the secure networking connection via the private VPN connection provides a VPN gateway between the cloud provider computing environment, the virtual diagnostic system, and the customer computing environment.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The technology described herein is described in detail below with reference to the attached drawing figures, wherein:

FIGS. 1A and 1B are block diagrams of an exemplary technical support management system for providing a virtual diagnostic system in a secure networking engine, in accordance with aspects of the technology described herein;

FIG. 1C-1G are block diagrams of an exemplary technical support management system for providing a virtual diagnostic system in a secure networking engine, in accordance with aspects of the technology described herein;

FIG. 5 provides a third exemplary method of providing a virtual diagnostic system in a secure networking engine, in accordance with aspects of the technology described herein;

DETAILED DESCRIPTION OF THE INVENTION

Overview

Figure 1B:
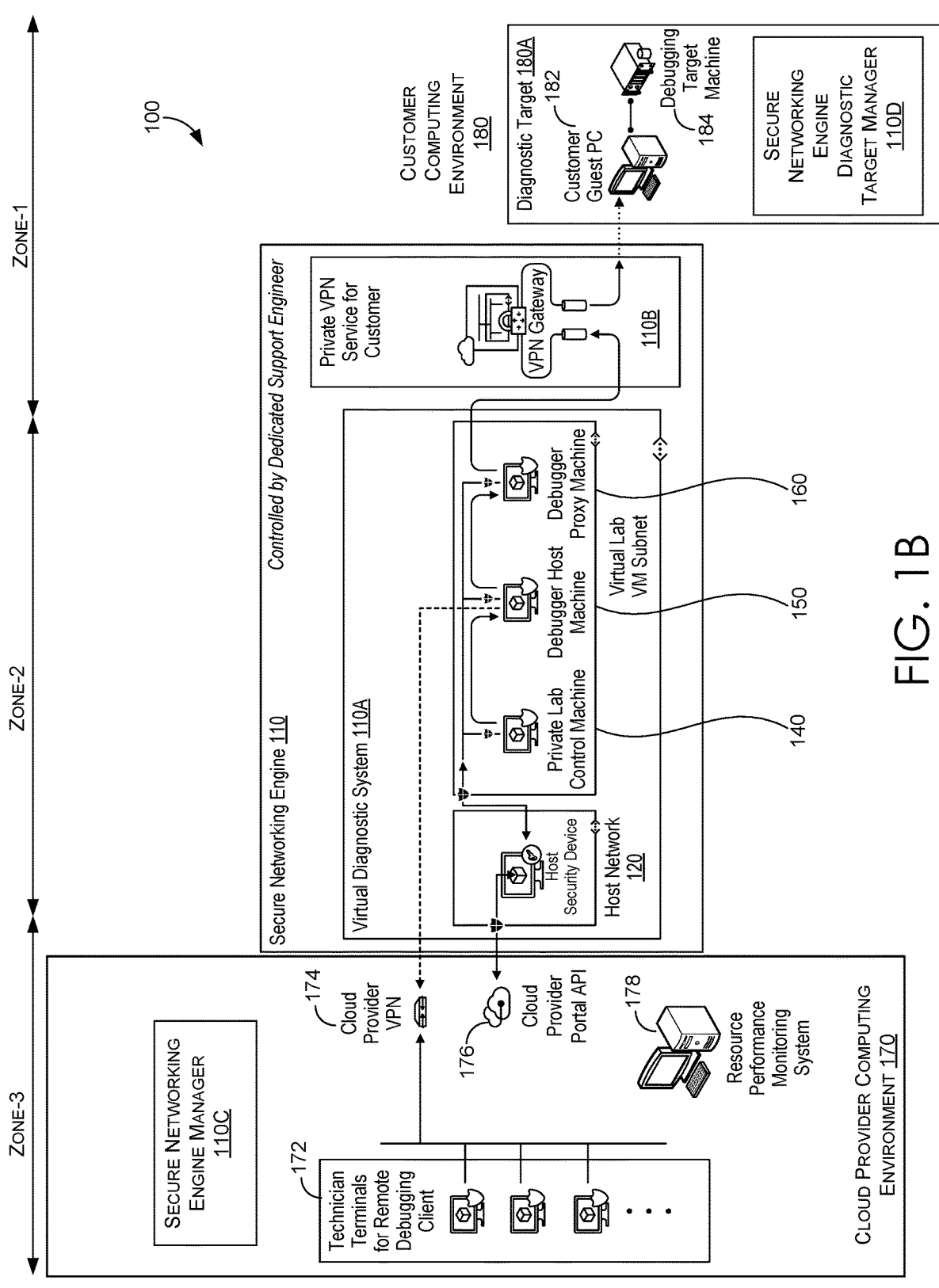

A cloud computing service provider (e.g., MICROSOFT—"cloud provider") supports customers of a cloud computing platform (e.g., MICROSOFT AZURE). A customer is provided a cloud computing environment (i.e., on-premise cloud computing environment or Platform-as-a-Service "PAAS"). The cloud computing provider may provide technical support services (e.g., diagnostic and debugging services via a technical support management system) to help manage a cloud computing environment. Technical support services can be provided using different types of technical support tools (e.g., AZURE BASTION). The cloud provider can implement the technical support management system—with remote access to customer computing environment—to provide diagnostic and debugging services. For example, a technical support tool can be operated—by a technician of the cloud computing provider—via a network connection to a customer computing environment. For example, the technician can connect to a virtual machine using a browser and a portal of the cloud computing platform.

A cloud computing technical support service and technical support operations may raise security concerns for the cloud computing provider and the customer. Both entities may have confidential information (e.g., proprietary and secure information) that they do not want to expose. For example, the cloud computing provider may not want the cloud computing technical support service software (e.g., source code, binaries, private symbols) to be installed in the customer computing environment and disclose their proprietary software (e.g., software for target device analysis operations) and the customer may not want the cloud computing technician to have access to their secure information on their servers.

Conventionally, technical support management systems are not configured with a comprehensive computing logic and infrastructure to efficiently provide adequate secure network communications—between a cloud provider computing environment and a customer computing environment—for technical support services of a cloud provider. For example, several different approaches (e.g., offline debugging using memory snapshots and live debugging via a customer-provided network connection or a cloud provider network connection) lack data structures, an arrangement of components, operations and interfaces to provide a suitable technical support management system.

By way of example, a conventional technical support management system may provide support based on a memory snapshot associated with the customer computing environment that need technical analysis. A snapshot dump (or snap dump) can refer to memory dump requested by the technician—or provided by an application or operating system—that is used to assist in diagnosing and debugging errors in computer programs. A memory snapshot in a customer computing environment—in a cloud computing platform—can be quite large and leads to significant latency when communicating the memory snapshot from the customer computing environment for analysis.

The memory snapshot can include encrypted data associated with technical data analysis and needs to be decoded using proprietary tools (e.g., decoding symbols) to identify any technical issues. Additionally, data associated with a customer computing environment may impute data residency considerations. Data residency refers to the data laws or regulatory requirement imposed on data based on the data laws that govern a country or region in which it resides. As such, in some cases, data cannot be transferred at all from the customer computing environment. Data boundary restrictions illustrate another limitation of a technical support management system that operates based on transferring memory snapshots.

A conventional technical support management system can be implemented based on a customer providing remote access to their customer computing environment. The network connection is associated with the customer and not the cloud computing provider, as such, the network connection is not necessarily a secure network connection and could compromise the security of the technical support service software of the cloud provider. In order to protect the confidential information associated with technical support service software, a technician may access the customer computing environment—without using the technical support service software; however, the technician has to manually analyze error logs (e.g., trace analysis) without the automation and functionality available via a technical support service software. A conventional technical support management system having a cloud-provider network connection may still raise concerns for a customer—whose computing environment will be accessed—if the cloud-provider network connection is susceptible to exposing confidential information of the customer. As such, a more comprehensive technical support management system—with an alternative basis for performing secure networking operations—can improve computing operations and interfaces in technical support management systems.

Embodiments of the present invention are directed to systems, methods, and computer storage media for, among other things, providing a virtual diagnostic system in a secure networking engine of a technical support management system. The virtual diagnostic system—in a dynamically identified secure networking engine site—provides a secure networking connection and diagnostic and debugging services between a cloud provider computing environment and a customer computing environment. The virtual diagnostic system includes a virtual lab virtual machine network and virtual diagnostic system machines (i.e., a private lab control machine; a debugger host machine; and a debugger proxy machine). The virtual lab virtual machine network (e.g., virtual lab VM subnet) operates in an instance of the secure network engine at the secure networking engine site.

At a high level, a cloud computing provider may provide a cloud computing environment, where the cloud computing environment has customers that utilize different types of application management functionality. Application management functionality can include a technical management system that supports customers that run into technical problems. With embodiments of the present disclosure, the technical management system specifically includes a secure networking engine. The securing networking engine provides a secure networking connection between the cloud provider computing environment and a customer computing environment. In particular, the secure networking engine can support—via a secure networking connection—real-time diagnostic and debugging services for customer computing environments with improved security and latency based on security computing components of the secure networking engine.

As discussed above, there are several security reasons for providing a secure networking connection when providing technical support services in a customer computing environment. The secure networking engine and the secure networking connection allow technicians of the cloud provider computing environment to access diagnostic target machines of the customer computing environment. The secure networking connection allows access to the customer computing environment while restricting access to confidential information (e.g., secure information and proprietary information) of the customer. In this way, a technician of the cloud computing provider can perform technical support services without access confidential information.

By way of illustration, the customer computing environment provides a customer guest PC that can access a VPN gateway. In one implementation, the customer guest PC is configured on a corporate domain network of the customer. The customer computing environment can include one or more diagnostic targets (e.g., computing devices associated with the technical support services). A diagnostic target has location parameters. Location parameters can include network interface identification, location addressing, and other related parameters that support identifying a location of the diagnostic target in a network associated with the customer computing environment and the cloud computing environment. The location parameters of the diagnostic target are used to identify a secure networking engine site for providing technical support services. The secure networking engine site can refer to a computing environment having a secure networking engine that is dynamically instantiated to provide secure technical support services closer to the diagnostic target. The location parameters are associated with a zone-1 private Internet Protocol (IP) address space associated a portion of the secure networking engine and the customer computing environment.

The secure networking engine can include security computing components that are closer to the diagnostic target to improve security and bandwidth for technical support services communications. The secure networking engine includes a virtual diagnostic system having a host security device, a private lab control machine, a debugger host machine, and a debugger proxy machine. The host security device, the private lab control machine, the debugger machine, and the debugger proxy machine each support different types of secure networking engine operations for providing secure technical support services. In particular, the secure networking engine operations are associated with three different Internet Protocol (IP) address zones associated with the customer computing environment, the secure networking engine site, and the cloud provider computing environment. As discussed, the location parameters are associated with a zone-1 private Internet Protocol (IP) address space—and, the virtual diagnostic system is associated with a zone-2 private IP address space, and technician terminals of the cloud provider computing environment are associated with a zone-3 cloud provider private support network address space.

Advantageously, the embodiments of the present invention include several inventive features (e.g., operations, systems, engines, and components) associated with a technical support management system having the secure networking engine. Inventive features will be described with reference to operations for providing a virtual lab virtual machine network associated with a secure networking engine that provides a virtual diagnostic system in a technical support management system. Functionality of the embodiments of the present invention will further be described, by way of an implementation and anecdotal examples, to demonstrate that the operations—for dynamically instantiating the secure networking engine at a secure networking engines site to support technical support services across a plurality of IP address zones—as a solution to a specific problem in search technology environment to improve computing operations and user interface navigation in item listing and search systems. For example, the operations provide real-time diagnostic and debugging services for customers of a cloud computing environment based on live rapid response operations associated with the cloud provider computing environment and technical experts. Overall, these improvements result in less CPU computation, smaller memory requirements, and increased flexibility in search systems.

Aspects of the technical solution can be described by way of examples and with reference to FIGS. 1A-1G. FIG. 1A illustrates a technical support management system 100. Technical support management system 100 includes secure networking engine 110, virtual diagnostic system 110A, private VPN service 110B, host network 120, secure networking engine network 130 with private lab control machine 140, debugger host machine 150, and debugger proxy machine 160; cloud provider computing environment 170 with secure networking engine manager 110C, customer computing environment 180 with secure networking engine diagnostic target manager 110D, and network 190.

The technical management system 100 provides a secure networking engine 110 that provides a secure networking connection for technical support services. The technical support service can be a diagnostic and debugging tool or service that is implemented via the secure networking engine 110. The secure networking connection is provided between the cloud provider computing environment 170 and the customer computing environment 180. The secure networking engine 110—operating at a secure networking engine site—provides a secure networking connection that isolates the cloud provider computing environment 170 from the customer computing environment 180 where communications are via the secure networking engine 110.

The cloud provider computing environment 170 is a cloud computing service operated by a cloud provider for application management. The cloud provider computing environment 170 can support different types of services, programming languages, tools and frameworks for application management. The cloud provider computing environment 170 operates with a customer computer environment to provide application management. The customer computing environment 180 can include on-premise computing components that are supported by the cloud provider computing environment 180. The cloud provider computing environment 170 includes secure networking engine manager 110C and the customer computing environment 180 includes secure networking engine diagnostic target manager 110D. The secure networking engine manager 110C and the secure networking engine diagnostic target manager 110D each support respective technical support management system operations to support the functionality described herein. For example, secure networking engine manager 110C and the secure networking engine diagnostic target manager 110D operate as client-side managers to support instantiating and performing technical support management system operations at the secure networking engine 110.

The secure networking engine 110 can be dynamically instantiated, as such, does not require a fixed machine or system that is permanently dedicated to hosting the secure networking engine 110. In this way, a customer may request instantiating the secure networking engine 110 on an as-needed basis for providing technical support services. The secure networking engine 110 can be instantiated close to the customer computing environment 180 to improvement connectivity and latency between the customer computing environment 180 and the cloud provider computing environment 170. As such, the secure networking engine 110 supports near real-time operations for the technical support service software and a better technician support experience.

The secure networking engine 110 includes the virtual diagnostic system 110A having the host network 120 (e.g., a bastion host). The host network includes a host machine (not shown) that operates as a special-purpose computer specifically designed and configured to withstand attacks. The host machine can specifically host a single application or process with other services removed or limited to reduce threat to the computer. The host network 120 may operate as a subnet that is isolated from secure networking engine network 130 (i.e., virtual lab virtual machine (VM) network) having the private lab control machine 140, debugger host machine 150, and debugger proxy machine 160).

The secure networking engine network 130 supports operations associated with providing technical support services. The private lab control machine 140 can provide a controlled environment for the technical support services operations, the debugger host machine can provide an environment for running debugging operations for finding and resolving errors, and the debugger proxy machine 160 operates as a proxy for the debugger host machine 150 for communications with the customer computing environment 180. The debugger proxy machine 160 can communicate with the debugging target machine 184 through the secure networking connection via the private VPN. The debugger host machine 150 operates as a main central controller device for performing diagnostic and debugging operation commands and manipulates each of the diagnostic messages from the technician terminal to send and receive detailed operations and commands to the debugging target machine through the customer guest PC, and send back the diagnostic result to the technician terminal. The data-flow and connection topology is integrated into the virtual diagnostic system 110A and flexibly deployed on-demand.

With reference to FIG. 1B, FIG. 1B illustrates secure networking engine 110, secure networking engine manager 110C, secure networking engine diagnostic target manager 110D, virtual diagnostic system 110A, private VPN service 110B, host network 120, secure networking engine network 130 with private lab control machine 140, debugger host machine 150, and debugger proxy machine 160; cloud provider computing environment 170, and customer computing environment 180. The cloud provider computing environment 170 includes a plurality of technician terminals (e.g., technician terminal 172), cloud provider VPN 174, and resource performance monitoring system 178. The customer computing environment 180 includes diagnostic target 180A, customer guest PC 182, and debugging target machine 184.

Operationally, technicians of the cloud computing environment 170 can access diagnostic target machines of the customer computing environment 180 through the secure networking engine 110. Access to the customer computing environment 180 is provided while restricting access to confidential information (e.g., secure information and proprietary information). The customer computing environment 180 is accessible for technical support service operations—based on the configuration of secure networking engine 110—and thus restricting any access to confidential information by the cloud provider. The cloud provider computing environment 170 granted access to perform technical support service operations—based on the configuration of the secure networking engine—and thus restricting any access to confidential information by the customer.

The technician terminal 172 operates in the cloud provider computing environment 170. The technician terminal 172 communicates with the debugger host machine 150 of the virtual diagnostic system. The debugger host machine 150 can host a debugging application (e.g., WINDBG), where the debugging application supports finding and resolving errors in a system. The debugging application can support debugging user mode applications, device drivers, and an operating system in kernel mode. The debugger host machine 150 via the debugger proxy machine 160 communicates with the customer computing environment 180 via a VPN gateway. Communications via the VPN gateway can be encrypted (e.g., a VPN key). For example, an X.509 key can be required for the secure networking connection via the private VPN gateway. The VPN key can be configured to a limited period of time (e.g., typically 2 day but less than 7 days). A new key can be assigned to each session between the virtual diagnostic system and the customer guest PC. The secure networking engine further includes the private VPN service 110B that provides a VPN gateway for communication between the secure networking engine network 130 and the customer computing environment.

The customer computing environment 180 accesses a private VPN gateway associated with private VPN service 110B via a computing device (e.g., customer guest PC 182). The customer guest PC can be configured as a corporate domain network computing device, a public network computing device, or a private network computing device. The customer guest PC provides access to one or more debugging target machines (e.g., debugging target machine 184).

The secure networking engine manager 110C is responsible for providing autonomic cloud resource selection operations. Selecting a closest cloud site for deploying resources for instantiating a virtual diagnostic system can be based on a set of base metrics parameters and for selecting failover sites. In one embodiment, live technical services operations (e.g., diagnostic/debugging operations) can be focused on a user experience for technician terminal operation (i.e. Windows Debugger terminal) internal technical— not the operation experience on debugger host machine (diagnostic execution machine) in the secure networking engine 110.

The cloud provider computing environment 170 includes the cloud provider VPN 174 that provides a VPN gateway between the technician terminal 172 and the debugging host machine 150. The cloud provider computing environment 170 also includes a cloud provider portal Application Programming Interface (API) that connects a host security device of the host network 120 with a resource performance monitoring system 178. The resource performance monitoring system 178 provides resource monitoring operations associated with hardware (e.g., CPU, memory, disk, and network) and software (file handles and modules) resources in the technical support management system. The resource performance monitoring system 178 can provide information to the secure networking engine manager 110C to support autonomic best connecting-site selection, base metrics and environmental factors and selection of the best failover site. The cloud provider portal API can support accessing information about the VMs in the virtual lab VM subnet via the host network and communicate the information to the resource performance monitoring system 178.

Figure 1C:
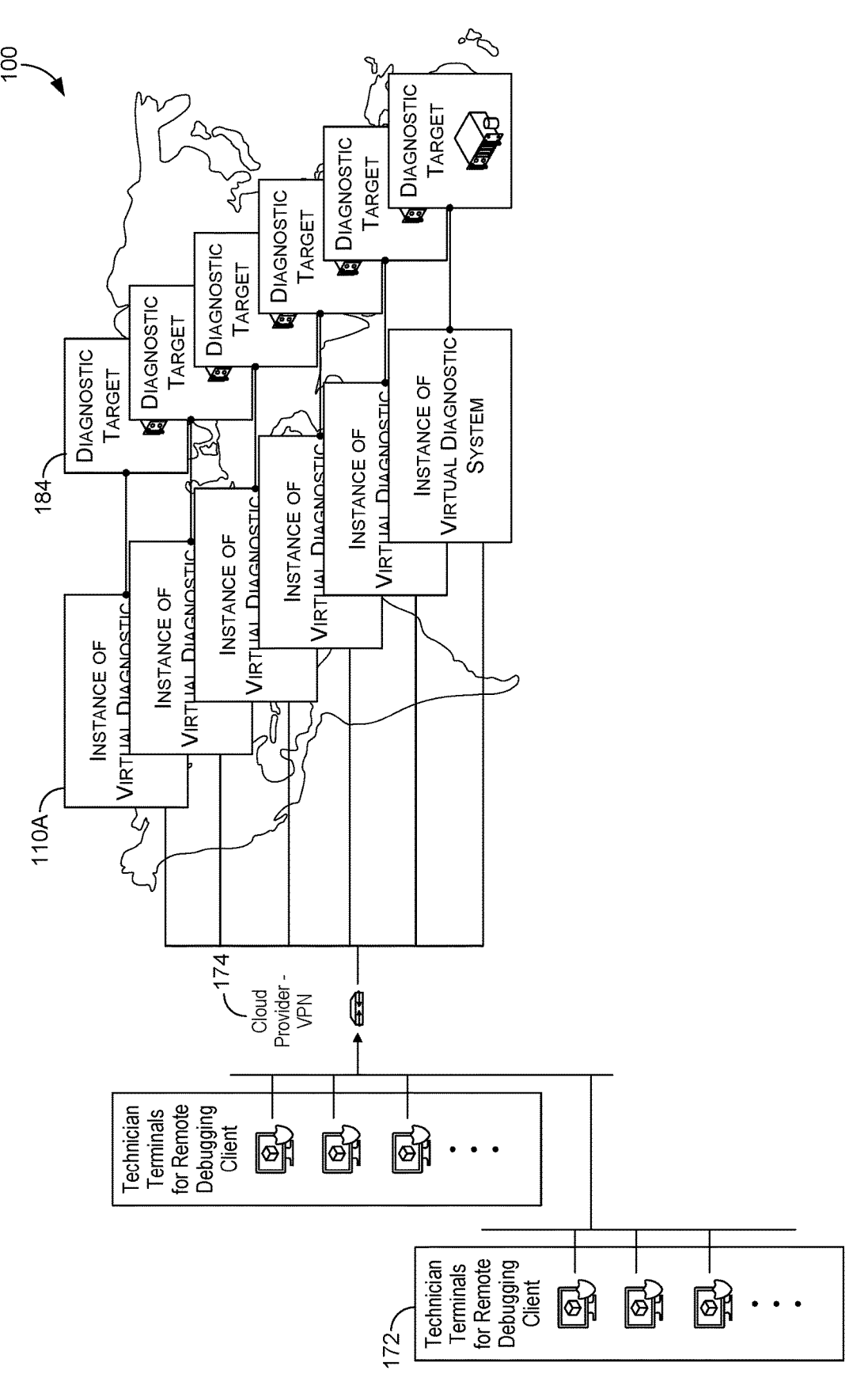

With reference to FIG. 1C, FIG. 1C illustrates technical support management system 100 with a plurality of technician terminals (e.g., technician terminal 172), cloud provider VPN 172, a plurality of instances of a virtual diagnostic system (e.g., virtual diagnostic instance 110A) and a plurality of diagnostic targets (e.g., diagnostic target 184). The technical support management system 100 support for multiple instances of virtual diagnostic engines providing technical support services for different diagnostic targets. The technical support management system can support autonomic best connecting site (i.e., secure networking engine site) selection; best metrics and environmental factors (e.g., candidate secure networking engine score for network bandwidth and cost); and best failover sites (i.e., secure networking engine failover sites).

Figure 1D:
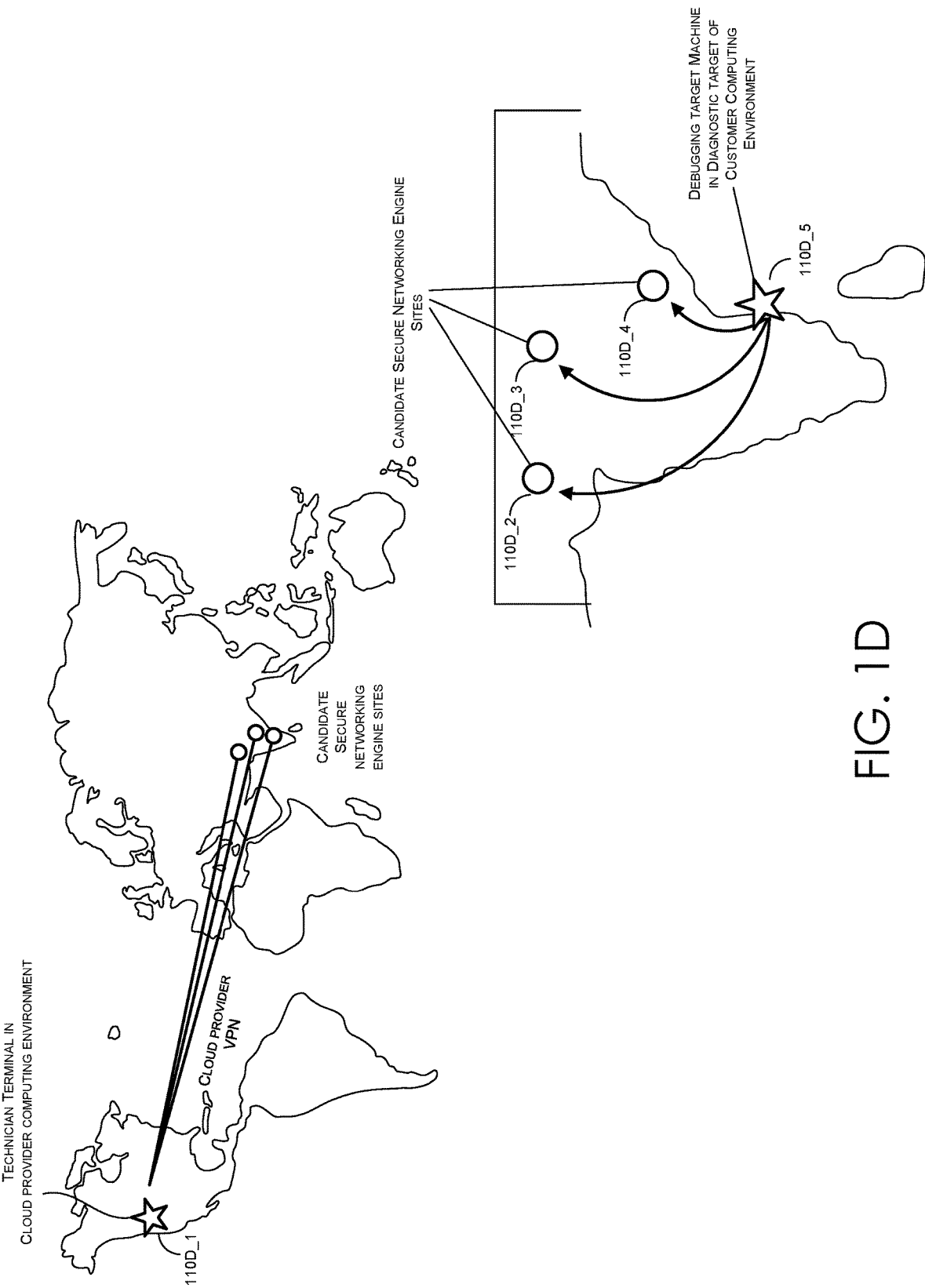

With reference to FIG. 1D, FIG. 1D illustrates a schematic associated with determining a secure networking engine site for providing a secure networking engine having a virtual diagnostic system. FIG. 1D includes technician terminal 110D_1 in a cloud provider computing environment associated with a cloud provider VPN that communicates with a plurality of candidate secure networking engine sites (e.g., candidate secure networking engine site 110D_2, 110D_3, and 110D_4) and a debugging target machine 110D_5 in a diagnostic target of a customer computing environment. As discussed, a debugging target machine may require technical support services from a technical support management system of the cloud provider computing network. The debugging target machine 110D_5 can be part of diagnostic target of the customer computing environment.

A diagnostic target of the debugging target machine 110D_5 can include a plurality of computing and networking components that support providing technical support services from the technical support management system. Based on the debugging target machine 110D_5 requiring technical support services, a request to instantiate a secure networking engine site can be generated at the cloud provider computing environment or customer computing environment. The request can include location parameters associated with the debugging target machine 110D_5. Based on the location parameters of the debugging target machine 110D_5 or location parameters of the diagnostic target of a customer computing environment, a plurality of candidate secure networking engine sites can be identified.

The candidate secure networking engine sites can be remote computing environments associated with the cloud provider that support dynamically instantiating a secure networking engine. The candidate secure networking engine sites can be associated with a candidate secure networking engine site score that is used to rank the plurality of candidate secure networking engine sites relatively to each other. The candidate secure networking engine site scores can be based on a network bandwidth score or cost score, as discussed in more detail below. Based on the candidate networking engine site score generated based on the network bandwidth score and/or the cost, a candidate secure networking engine site is selected as the secure networking site for dynamically instantiating the secure networking engine and providing technical support services.

Figure 1E:
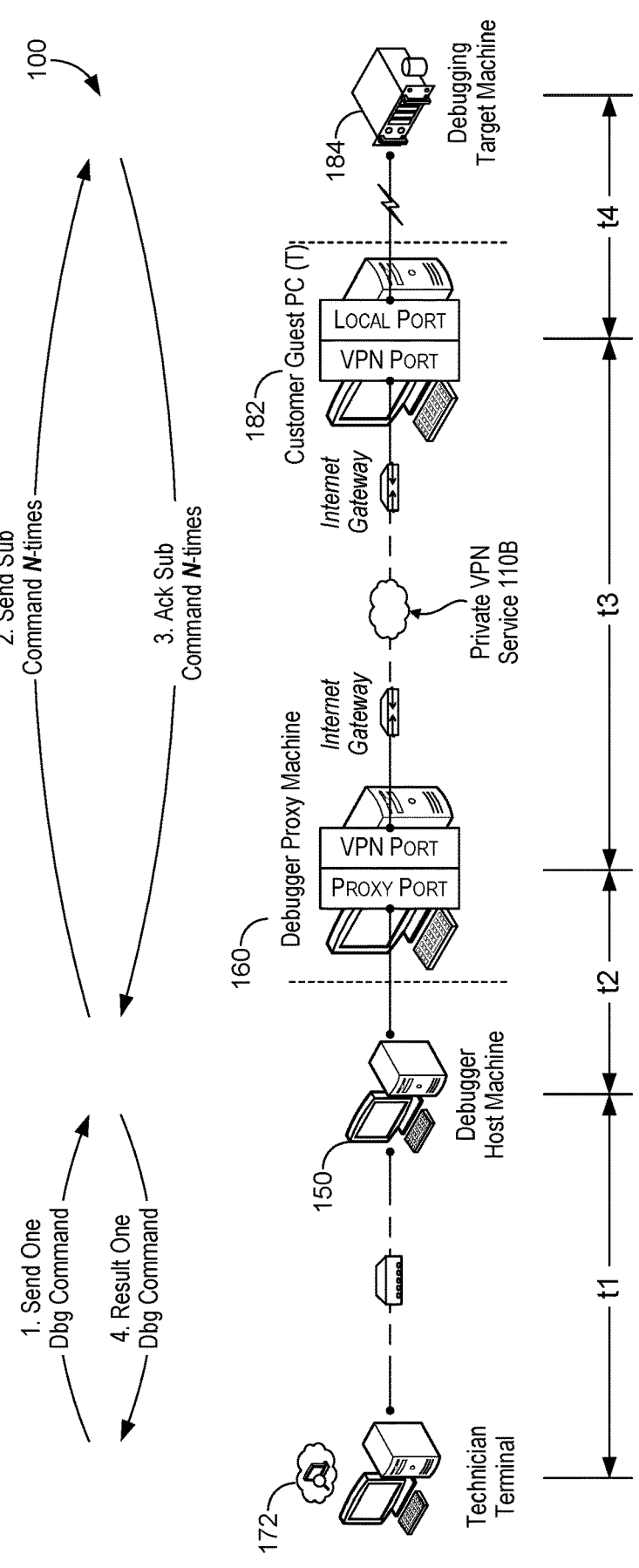

With reference to FIG. 1E, FIG. 1E illustrates base metrics parameters for autonomic selection for a secure networking engine site. FIG. 1E includes technician machine 172, debugger host machine 150, debugger proxy machine 160, private VPN service 110B, customer guest PC 182, and debugger target machine 184; and a plurality of response times (e.g., t1, t2, t3 and t4). Remote operators— who are participating in the live technical services operations for the remote target machine located at virtual diagnostic system with private symbols such as OS feature team and engineer—can use a shared diagnostic and debugger session through debugger host machine in the secure networking engine.

At step 1, a first technical support instruction (e.g., Dbg command) is communicated from the technician terminal 172 to the debugger host machine 150; at step 2 a second technical support instruction (e.g., sub command) is communicated N-times from the debugger host machine 150 to diagnostic target machine 184 via the debugger proxy machine 160 and the customer gest PC 182; at step 3 a response to the second technical support instruction is communicated N-times from the debugging target machine 184; and at step 4, a response to the first technical support instruction (e.g., Dbg command result) is communicated. N can be 1 or any number greater than 1.

The total response time is represented for remote operators as:

Total Response Time for 1-dbg command:

$$T = [t1 + N*(t2 + t3 + t4 + t4 + t3 + t2) + t1]$$

$$= 2*t1 + 2*N*(t2 + t3 + t4)$$

$$= 2*t1 + 2*N*t_c \ [t_c = t2 + t3 + t4]$$

$N: (1 \leq N < 100 \ K)$ This number represents

*WinDbg* internal sub−commands iteration counts, and different values for each diagnostic control (i.e. *WinDbg*) command set.

11

-continued

2 ∗ *t*1: This value is closely same as "Ping" Latency speed for

Technician Terminal 172 to Debugger Host Machine 150.

2 ∗ *t*$_c$: This value is closely same as "Ping" Latency speed for

Debugger Host Machine 150 to Debugging Target Machine 184.

In this way, the secure networking engine 100 provides a virtual diagnostic system that is configured to reduce the response time for 1-dbg or 1-diagnostic command (=7), and minimize this response time delays even though the target device is located in another geographical location for a real-time live debugging and diagnostics operation.

The secure networking engine 110, by way of illustration, via a simulation, can provide a response time with N, and the target is located at India. With a target location of India, an electrical signal transferring distance can be 12,120 km. Expectable electrical signal transferring time from West US2-South India=194 ms (cf. Ideal light signal transferring time: 12,120 km/300,000 km=40 ms). Model latency time between the cloud provider computing environment and the secure networking engine site=20 ms Signal Transferring Time (Total):=(194+20)/2=107 ms. Use $t_c$=t2+t3+t4 as for sub-total electrical signal transferring speed between Debug host machine in the virtual diagnostic system and the diagnostic target. Electrical signal transferring relation for t1 and $t_c$ formed as (t1+$t_c$)=107 ms. This indicates, $t_c$ is calculated as '(107−t1) ms The ideal total data transferring time (=T) is calculated with N as:

$$T = 2 * t1 + 2 * N(t2 + t3 + t4) = 2 * t1 + N * 2 * (t_c)$$
$$= 2 * t1 + N * 2 * (107 - t1) \text{ and this formula result is plotted.}$$
$$\text{with } N - \text{number in } FIG. 1F$$

Figure 1G:
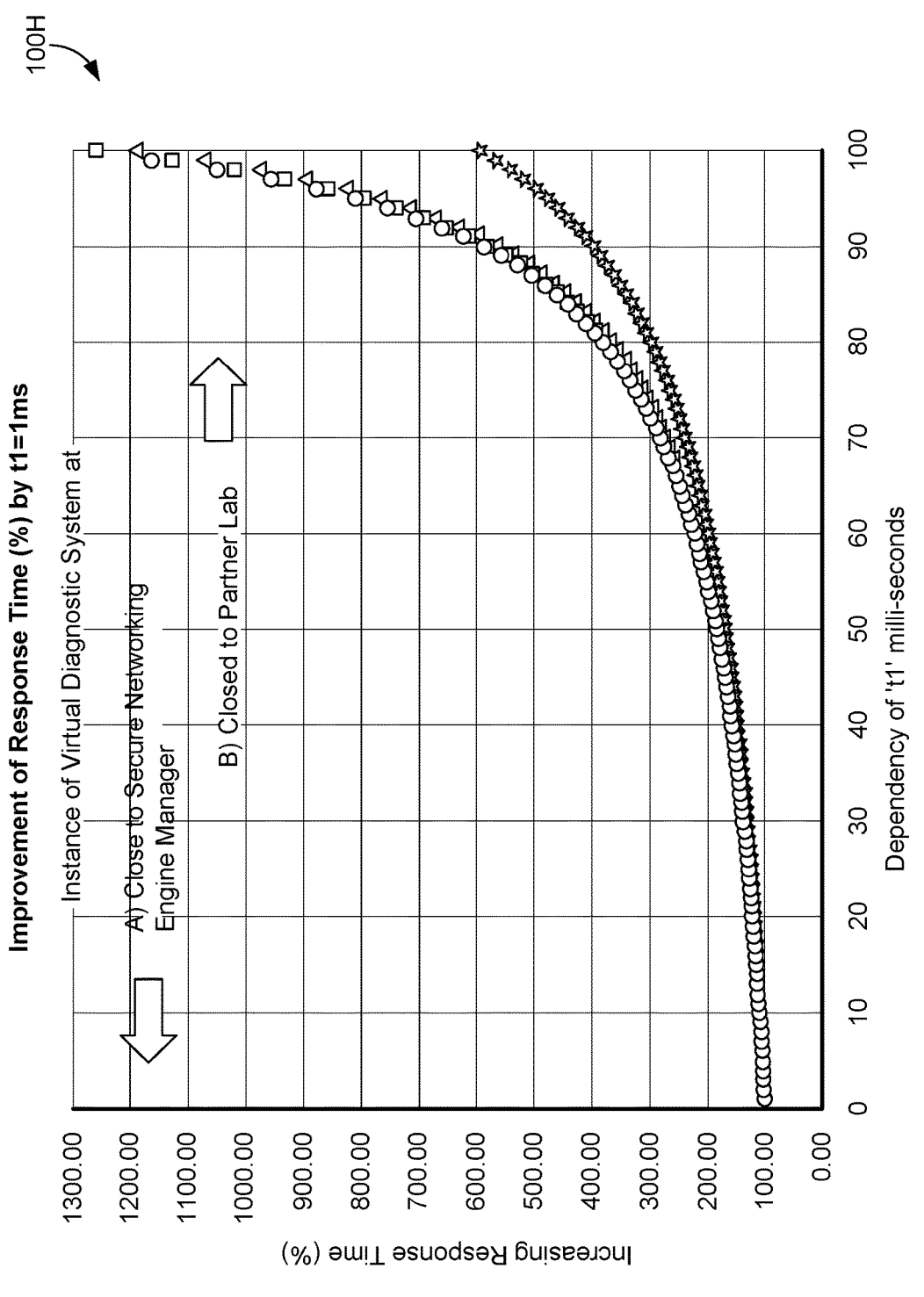

As shown in FIG. 1F, FIG. 1F indicates selecting the secure networking engine site is key, and a different location for the security network engine is much faster than the cloud provider computing environment. FIG. 1G illustrates ideal response time improvement ratio compared to the time of 't1' as 1 ms. It is contemplated that the comparison is for the latency time from the technician terminal on to the debugger host machine in an instance of virtual diagnostic system. Moreover, a response time associated with a technician user experience at a technician terminal may defined for a technical support service session. The network bandwidth score can be based on an actual response time for one or more candidate secure networking engine sites. The network bandwidth score can be used to as a factor in selecting a secure networking engine site. An increase in the response can be identified with can be based on a distance between the cloud provider computing environment and the secure networking engine site. It is contemplated one or more additional factors can be associated with selecting the secure networking engine. For example, compute cost (i.e., cost) such as on-demand computing cost associated with compute capacity, disk size, network usage etc., for the candidate secure networking engines can be determined and score (i.e., cost score) against each other. The cost score can alone or in combination with additional factors can support selecting a secure networking engine site. Other variations and combinations of scores—for a candidate secure networking engine score—are contemplated with embodiments described herein.

The secure networking engine manger 110C is responsible for providing autonomic cloud resource selection operations. In particular, the secure networking engine manager 110C may operate with the resource performance monitoring system 178 to provide autonomic site selection with environmental metrics parameter combined with base metrics parameter, for secure networking and second site as a failover backup site.

The estimated workload response time is calculated with the following formula:
Site Location Specific Speed Estimation:

$$R(Site_{SiteLoc})=t_c(Site_{SiteLoc})+t_{ad}(Site_{SiteLoc})+T_w(Site_{SiteLoc})$$

R( ): Diagnostic Command Specific Total Time of Response Speed $t_c$( ): Sampling Response speed reporting information on the customer's Guest PC(T) from between Virtual Diagnostic System (Typical target is debugger proxy machine) and Diagnostic Target Machine in Customer Lab (Typical target is Customer Guest PC(T))

$t_{ad}$( ): A measured response speed between Technician terminal and Virtual Diagnostic System on Secure Networking Engine (Typical target is Debugger Host Machine)

[Usually, this factor will be in 1-2% or less for $t_c$( )]

$T_w$( ): A measured transaction response speed between Virtual Diagnostic System (Typical target is Debugger Proxy Machine) and its referenced non-Technician Terminal (i.e. Private Symbol Server's data access workload latency, etc.) by Debugger Host Machine (Diagnostic Execution Machine) on Azure Cloud (Debugger Proxy Machine).

[Usually, this factor will be in 10~20% or less for $t_c$( )]

On the Resource Performance Monitoring System the estimated response speed is sampled for each of candidate secure networking engine sites as:

Site-A: $R_1(Site_A)=t_c(Site_A)+t_{ad}(Site_A)+Tw(Site_A)$

Site-B: $R_2(Site_B)=t_c(Site_B)+t_{ad}(Site_B)+Tw(Site_B)$

Site-C: $R_3(Site_C)=t_c(Site_C)+t_{ad}(Site_C)+Tw(Site_C)$

When the response time is not met with the expected criteria speed within the defined time of duration, a better secure networking engine site can be found to dynamically failover to another secure networking engine site to minimize a service response time. The secure networking engine manager can support this recalibration resource operation that can be performed at different times (e.g., at the beginning of a diagnostic session starting, the session idle time, and a occurrence of a miscellaneous event such as cloud site disaster phase, or diagnostic session restarting or resume timing).

Figure 2A:
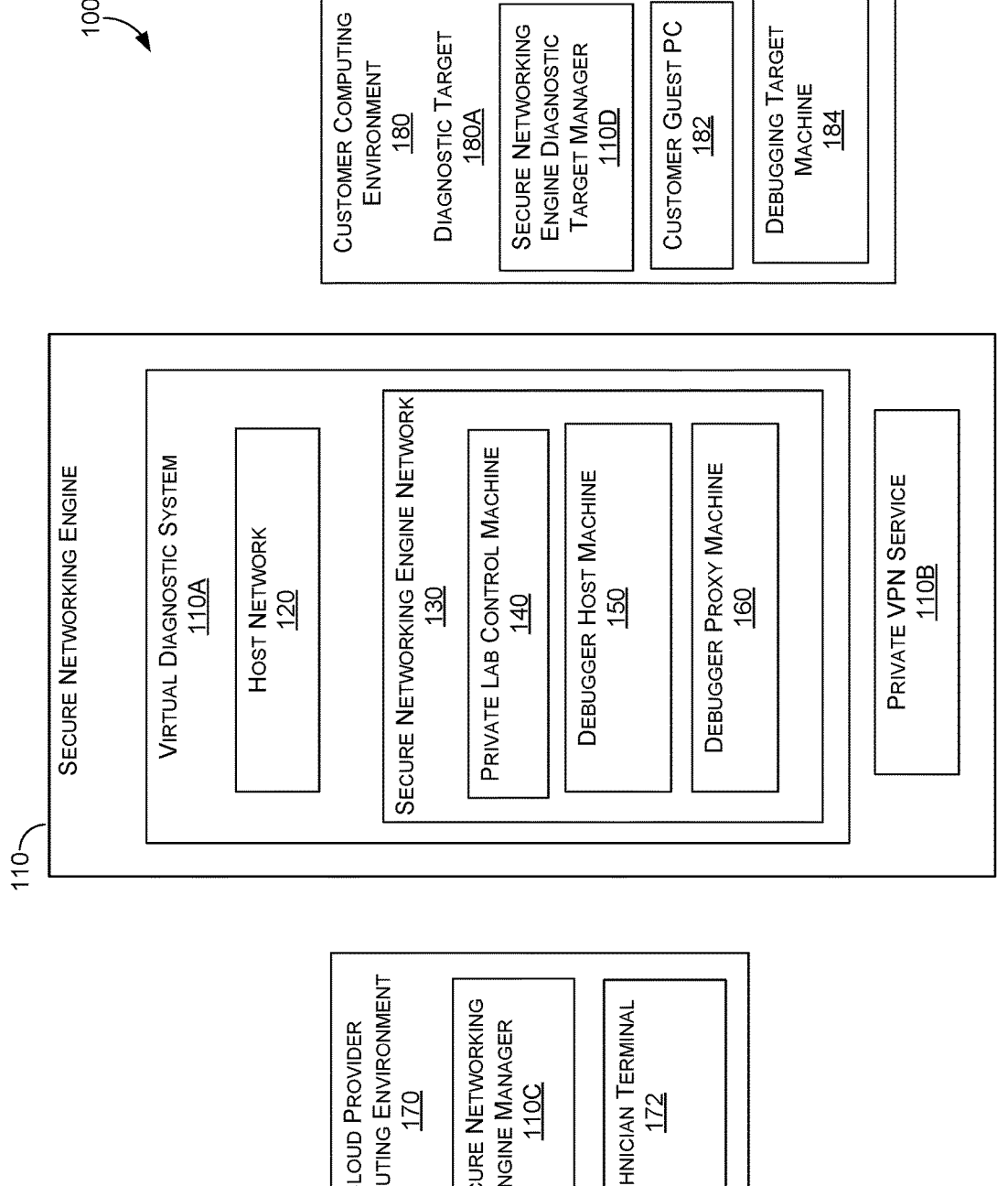
FIG. 2A is a block diagram of an exemplary technical support management system for providing a virtual diagnostic system in secure networking engine, in accordance with aspects of the technology described herein.
Figure 2B:
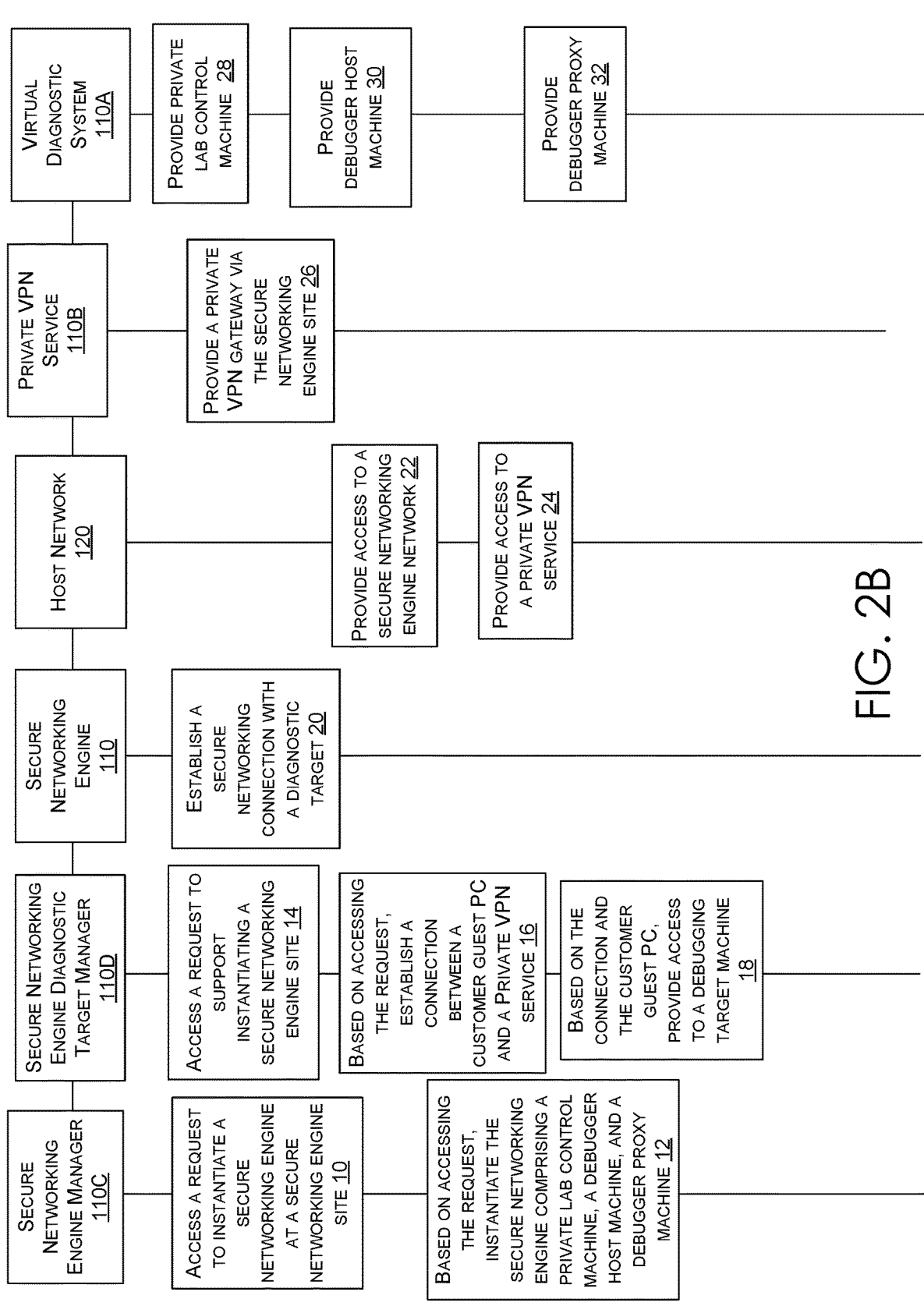
FIG. 2B is a block diagram of an exemplary technical support management system for providing a virtual diagnostic system in a secure networking engine, in accordance with aspects of the technology described herein.

Aspects of the technical solution can be described by way of examples and with reference to FIGS. 2A and 2B. FIG. 2A is a block diagram of an exemplary technical solution environment, based on example environments described with reference to FIGS. 6 and 7 for use in implementing embodiments of the technical solution are shown. Generally the technical solution environment includes a technical solution system suitable for providing the example technical support management system 100 in which methods of the present disclosure may be employed. In particular, FIG. 2A shows a high level architecture of the technical support management system 100 in accordance with implementations of the present disclosure. Among other engines, managers, generators, selectors, or components not shown (collectively referred to herein as "components"), the technical solution environment of data technical support management system 100 corresponds to FIGS. 1A and 1B.

With reference to FIG. 2A, FIG. 2A illustrates secure networking engine 110, virtual diagnostic system 110A, private VPN service 110B, host network 120, virtual lab virtual machine network with private lab control machine 140, debugger host machine 150, and debugger proxy machine 160; cloud provider computing environment 170 with secure networking engine manager 110C, customer computing environment 180 with secure networking engine diagnostic target manager 110D, and network 190.

The secure network engine manager 110 is responsible for accessing a request to instantiate the secure networking engine 110 or at least portions of the secure networking engine 110. The secure networking engine 110 supports providing technical services of the cloud provider computing environment 170 for the diagnostic target machine 184 in the customer computing environment 180. The request includes location parameters of one or more of the following: the customer computing environment 180, diagnostic target 180A, secure networking engine diagnostic target manager 110D, customer guest PC 182, and debugging target machine 184. Based on the location parameters, a secure networking engine site for instantiating the secure networking engine is determined. The location parameters are associated with a zone-1 private Internet Protocol (IP) address space. The virtual diagnostic system is associated with a zone-2 private IP address space, and the technician terminals of the cloud provider computing environment are associated with a zone-3 cloud provider private support network address space.

Determining the secure networking engine site is based on candidate secure networking engine scores. The candidate secure networking engine scores can include a network bandwidth score or a cost score. The candidate secure networking engine score—as a network bandwidth score, a cost score, or a combined score, support ranking a plurality of candidate secure networking engine sites relative to each other such that the secure networking engine site is selected for instantiating the secure networking engine. The secure networking engine is instantiated at the secure networking engine site including the virtual diagnostic system and a private virtual private network (VPN) service. The virtual diagnostic system is temporarily instantiated for a period of time associated with performing the technical support services.

A secure networking connection is caused to be established. For example, the secure networking engine manger, the secure networking engine, or the secure networking engine diagnostic target manager—individually or in combination—may cause establishment of the secure networking connection. The secure networking connection can be established between a VPN gateway between the cloud provider computing environment, the virtual diagnostic system, and the customer computing environment. The virtual diagnostic system is associated with a host machine in the host machine network 120. The host machine is connected via a cloud provider Application Programming Interface (API) to a resource performance management system of the cloud provider computing environment 170.

The debugger host machine 150 is responsible managing communications for providing technical support services. Technical support services can be associated with a plurality of communications between the technician terminals and the debugger target machine to facilitate debugging and diagnostic operations. For example, the technical support services can include a first technical support instruction, a second technical support instruction, and a response to the second technical support instruction. The debugger host machine is responsible for receiving a first technical support instruction associated with a technician terminal of the cloud computing environment. The first technical support instruction is received at the debugger machine via a cloud provider VPN that is a secure networking connection between the cloud provider computing environment and a secure networking engine site comprising the virtual diagnostic system. The first technical support instruction is processed via a virtual lab virtual machine subnet associated with a virtual diagnostic system.

A second technical support instruction based on the first technical support instruction is communicated to the debugger proxy machine 160 from the debugger host machine 150. The second technical support instruction can be the same as the first technical support instruction. The second technical support instruction can be a different technical support instruction that is constructed based on the first technical support instruction. The debugger proxy machine 160 communicates the second technical support instruction to the customer computing environment 180 via the secure networking connection. The secure networking connection isolates the cloud provider computing environment from the customer computing environment based on communications via virtual diagnostic system and the private VPN. The debugger proxy machine 160 is responsible for receiving a response to the second technical support instruction. The debugger proxy machine 160 communicates the response to the second technical support instruction to the debugger host machine 150. The debugger host machine communicates the response to the second technical support instruction to the technician terminal.

With reference to FIG. 2B, FIG. 2B illustrates a technical support management system 100. At block 10, the secure networking engine manager 110C accesses a request to instantiate a secure networking engine at a secure networking engine site. At block 12, based on accessing the request, the secure networking engine manager instantiates the secure networking engine comprising a private lab control machine, a debugger host machine, and a debugger proxy machine.

At block 14, the secure networking engine diagnostic target manager 110D accesses a request to support instantiating a secure network engine site. Based on accessing the request, the secure networking engine diagnostic target manager 110D establishes a connection between a customer guest PC and a private VPN service. At block 18, based on the connection and the customer guest PC, the secure networking engine diagnostic target manager 110D provides access to a debugging target machine.

At block 20, the secure networking engine 110 establishes a secure networking connection with a diagnostic target. At block 22, the host network 120 provides access to a secure networking engine network. At block 24, the host network 120 provides access to private VPN service. At block 26, the private VPN service 110B provides a private VPN service connection via the secure networking engine site. At block 28, the virtual diagnostic system 110A provides private lab control machine. At block 30, the virtual diagnostic system 110A provides a debugger host machine. At block 32, the virtual diagnostic system 110A provides debugger proxy machine.

Example Methods

Figure 3:
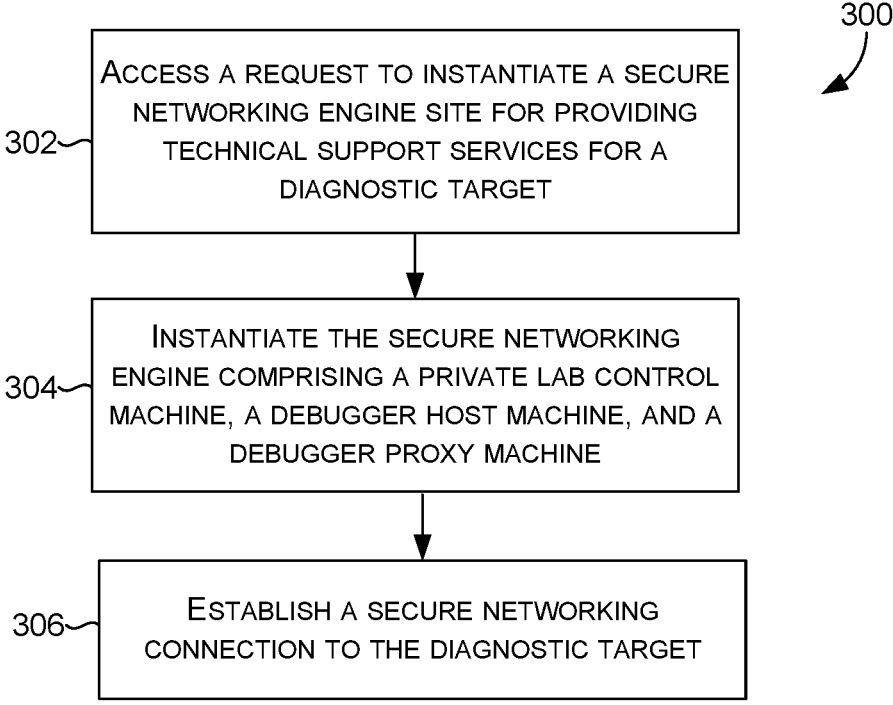
FIG. 3 provides a first exemplary method of providing a virtual diagnostic system in a secure networking engine, in accordance with aspects of the technology described herein.
Figure 4:
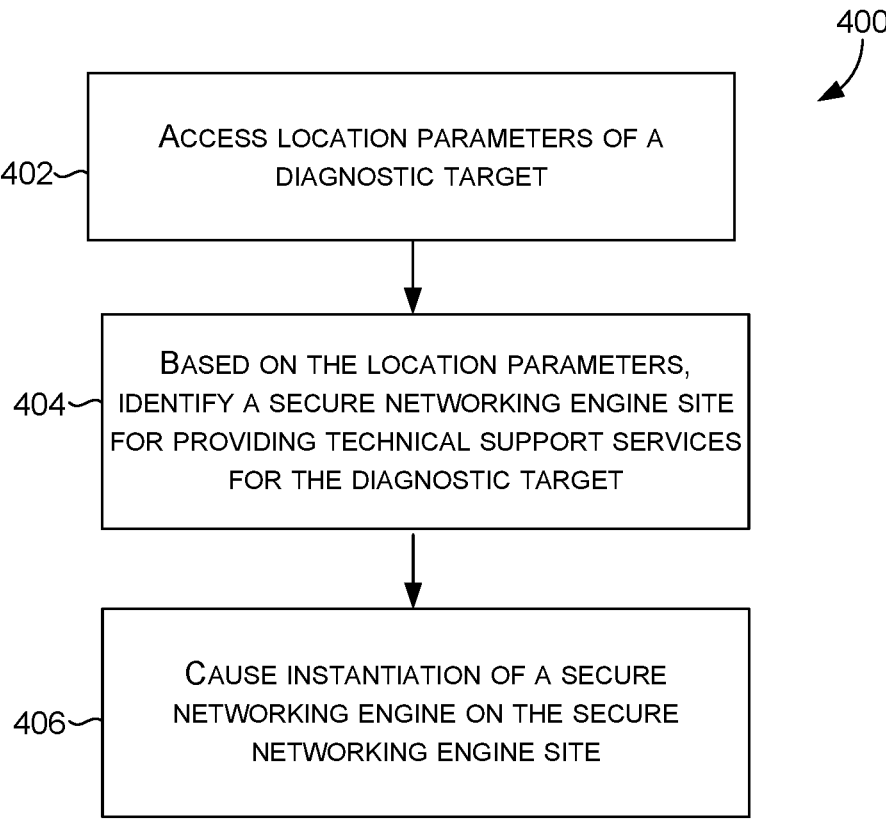
FIG. 4 provides a second exemplary method of providing a virtual diagnostic system in a secure networking engine, in accordance with aspects of the technology described herein.

With reference to FIGS. 3, 4, and 5, flow diagrams are provided illustrating methods for providing a virtual lab virtual machine network associated with a secure networking engine that provides a virtual diagnostic system in a technical support management system. The methods may be performed using the technical support management system described herein. In embodiments, one or more computer-storage media having computer-executable or computer-useable instructions embodied thereon that, when executed, by one or more processors can cause the one or more processors to perform the methods (e.g., computer-implemented method) in the technical support management system (e.g., a computerized system or computing system).

Turning to FIG. 3, a flow diagram is provided that illustrates a method 300 for a providing a virtual lab virtual machine network associated with a secure networking engine that provides a virtual diagnostic system in a technical support management system. At block 302, access a request to instantiate a secure networking engine site for providing technical support services for a diagnostic target. At block 304, instantiate the secure networking engine comprising a private lab control machine, a debugger host machine, and a debugger proxy machine. At block 306, establish a secure networking connection to the diagnostic target.

Turning to FIG. 4, a flow diagram is provided that illustrates a method 400 for a providing a virtual lab virtual machine network associated with a secure networking engine that provides a virtual diagnostic system in a technical support management system. At block 402, access location parameters of a diagnostic target. At block 404, based on the location parameters, identify a secure networking engine site for providing technical support services for the diagnostic target. At block 406, cause instantiation of a secure networking engine on the secure networking engine site.

Turning to FIG. 5, a flow diagram is provided that illustrates a method 500 for a providing a virtual lab virtual machine network associated with a secure networking engine that provides a virtual diagnostic system in a technical support management system. At block 502, instantiate a secure networking engine at a secure networking engine site for providing technical support services for a diagnostic target. At block 504, instantiate a virtual diagnostic system in the secure networking engine site, the virtual diagnostic engine comprising a host security device, a private lab control machine, a debugger host machine, and debugger proxy machine. At block 506, instantiate a private virtual network (VPN), wherein the private VPN provides a VPN gateway between a cloud provider computing environment, the virtual diagnostic system, and a customer computing environment.

Technical Improvement

Embodiments of the present invention have been described with reference to several inventive features (e.g., operations, systems, engines, and components) associated with a technical support management system. Inventive features described include: operations, interfaces, data structures, and arrangements of computing resources associated with providing the functionality described herein relative with reference to a secure networking engine. Functionality of the embodiments of the present invention have further been described, by way of an implementation and anecdotal examples—to demonstrate that the operations for providing the virtual lab virtual machine network as a solution to a specific problem in secure networking technology to improve computing operations in technical support management systems. Overall, these improvements result in less CPU computation, smaller memory requirements, and increased flexibility in technical support management systems when compared to previous conventional technical support management system operations performed for similar functionality.

Additional Support for Detailed Description of the Invention

Example Distributed Computing System Environment

Figure 6:
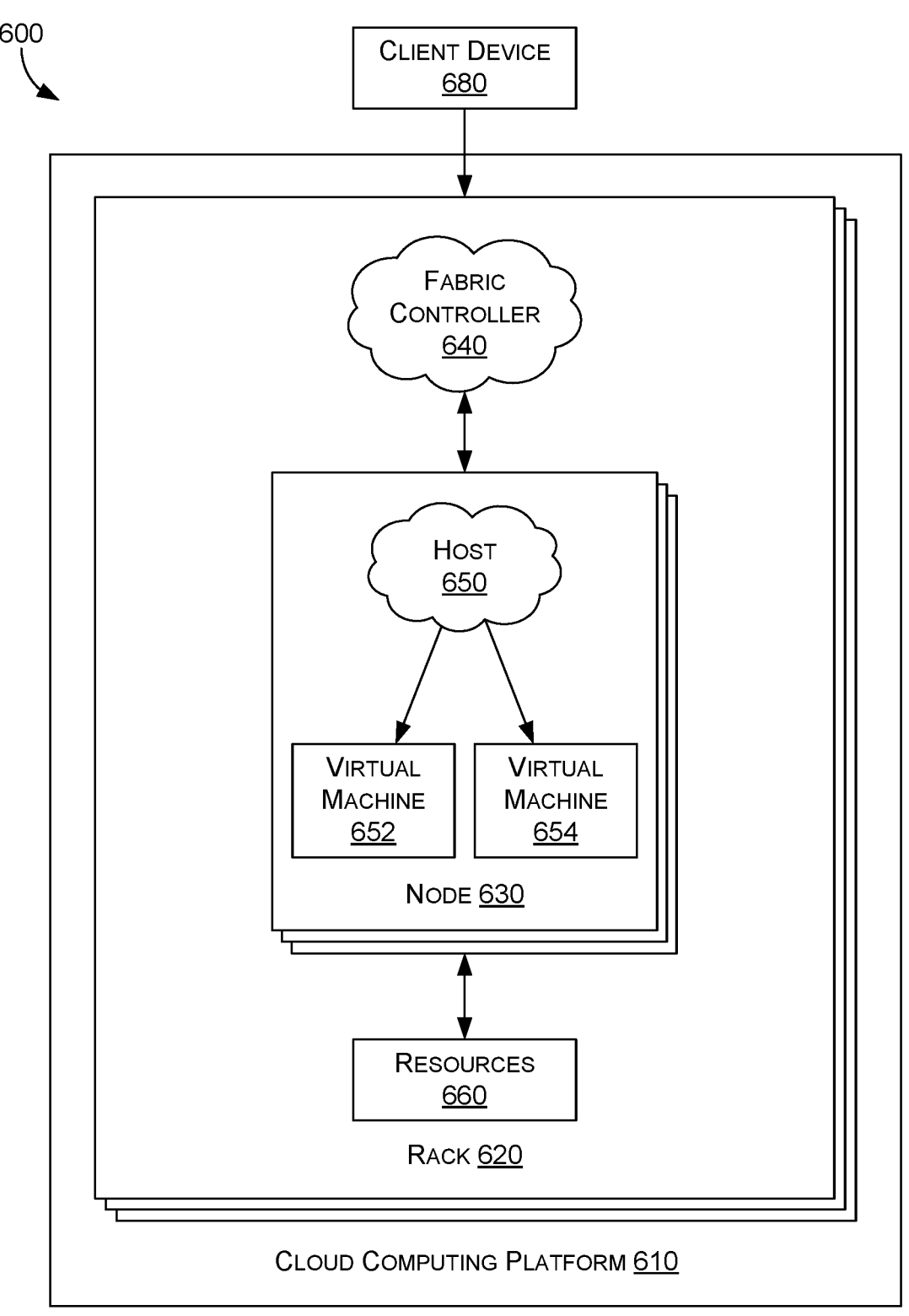
FIG. 6 provides a block diagram of an exemplary distributed computing environment suitable for use in implementing aspects of the technology described herein.

Referring now to FIG. 6, FIG. 6 illustrates an example distributed computing environment 600 in which implementations of the present disclosure may be employed. In particular, FIG. 6 shows a high level architecture of an example cloud computing platform 610 that can host a technical solution environment, or a portion thereof (e.g., a data trustee environment). It should be understood that this and other arrangements described herein are set forth only as examples. For example, as described above, many of the elements described herein may be implemented as discrete or distributed components or in conjunction with other components, and in any suitable combination and location. Other arrangements and elements (e.g., machines, interfaces, functions, orders, and groupings of functions) can be used in addition to or instead of those shown.

Data centers can support distributed computing environment 600 that includes cloud computing platform 610, rack 620, and node 630 (e.g., computing devices, processing units, or blades) in rack 620. The technical solution environment can be implemented with cloud computing platform 610 that runs cloud services across different data centers and geographic regions. Cloud computing platform 610 can implement fabric controller 640 component for provisioning and managing resource allocation, deployment, upgrade, and management of cloud services. Typically, cloud computing platform 610 acts to store data or run service applications in a distributed manner. Cloud computing infrastructure 610 in a data center can be configured to host and support operation of endpoints of a particular service application. Cloud computing infrastructure 610 may be a public cloud, a private cloud, or a dedicated cloud.

Node 630 can be provisioned with host 650 (e.g., operating system or runtime environment) running a defined software stack on node 630. Node 630 can also be configured to perform specialized functionality (e.g., compute nodes or storage nodes) within cloud computing platform 610. Node 630 is allocated to run one or more portions of a service application of a tenant. A tenant can refer to a customer utilizing resources of cloud computing platform 610. Service application components of cloud computing platform 610 that support a particular tenant can be referred to as a multi-tenant infrastructure or tenancy. The terms service application, application, or service are used interchangeably herein and broadly refer to any software, or portions of software, that run on top of, or access storage and compute device locations within, a datacenter.

When more than one separate service application is being supported by nodes 630, nodes 630 may be partitioned into virtual machines (e.g., virtual machine 652 and virtual machine 654). Physical machines can also concurrently run separate service applications. The virtual machines or physical machines can be configured as individualized computing environments that are supported by resources 660 (e.g., hardware resources and software resources) in cloud computing platform 610. It is contemplated that resources can be configured for specific service applications. Further, each service application may be divided into functional portions such that each functional portion is able to run on a separate virtual machine. In cloud computing platform 610, multiple servers may be used to run service applications and perform data storage operations in a cluster. In particular, the servers may perform data operations independently but exposed as a single device referred to as a cluster. Each server in the cluster can be implemented as a node.

Client device 680 may be linked to a service application in cloud computing platform 610. Client device 680 may be any type of computing device, which may correspond to computing device 600 described with reference to FIG. 6, for example, client device 680 can be configured to issue commands to cloud computing platform 610. In embodiments, client device 680 may communicate with service applications through a virtual Internet Protocol (IP) and load balancer or other means that direct communication requests to designated endpoints in cloud computing platform 610. The components of cloud computing platform 610 may communicate with each other over a network (not shown), which may include, without limitation, one or more local area networks (LANs) and/or wide area networks (WANs).

Example Computing Environment

Having briefly described an overview of embodiments of the present invention, an example operating environment in which embodiments of the present invention may be implemented is described below in order to provide a general context for various aspects of the present invention. Referring initially to FIG. 6 in particular, an example operating environment for implementing embodiments of the present invention is shown and designated generally as computing device 600. Computing device 600 is but one example of a suitable computing environment and is not intended to suggest any limitation as to the scope of use or functionality of the invention. Neither should computing device 700 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc. refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

Figure 7:
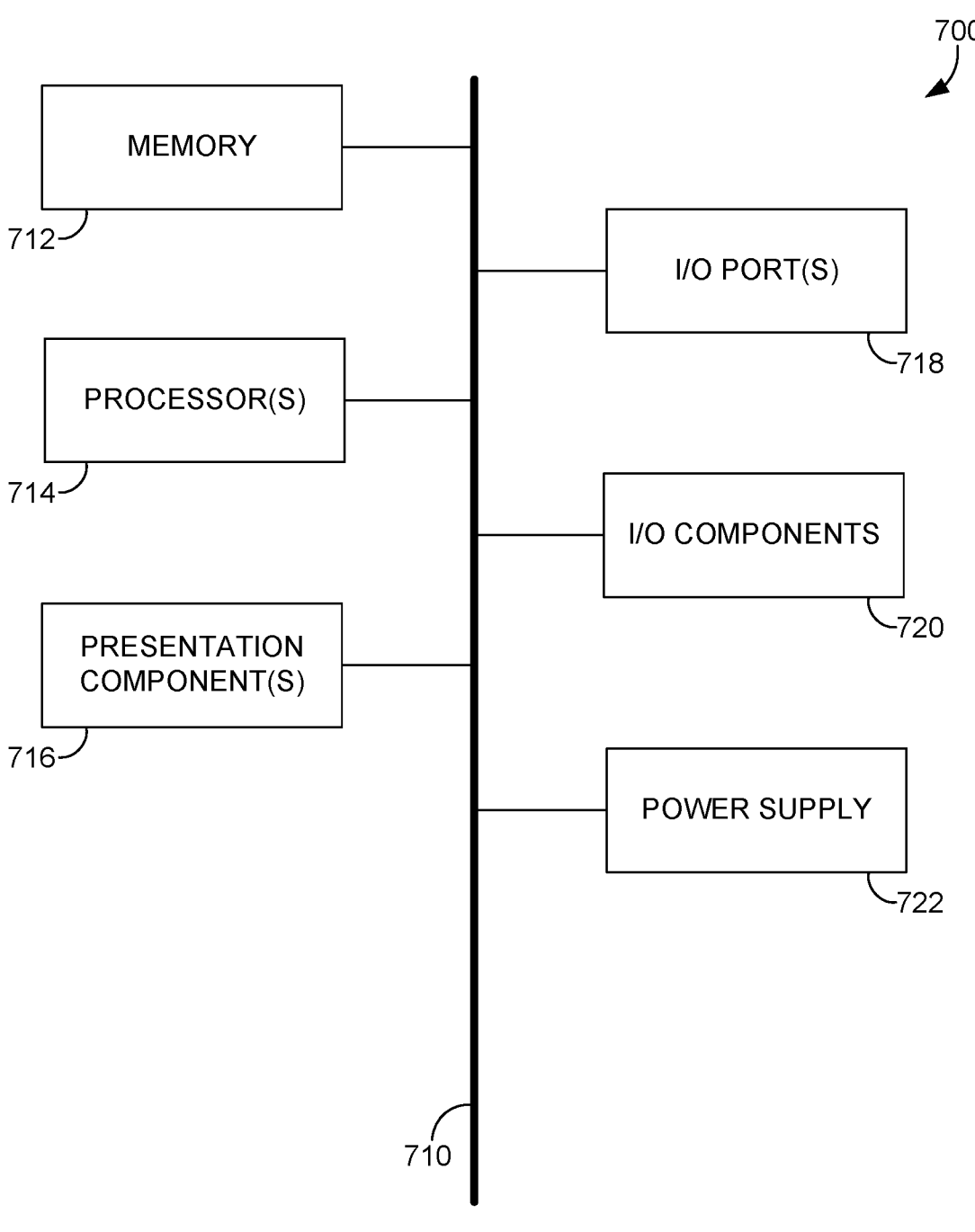
FIG. 7 is a block diagram of an exemplary computing environment suitable for use in implementing aspects of the technology described herein.

With reference to FIG. 7, computing device 700 includes bus 710 that directly or indirectly couples the following devices: memory 712, one or more processors 714, one or more presentation components 716, input/output ports 718, input/output components 720, and illustrative power supply 722. Bus 710 represents what may be one or more buses (such as an address bus, data bus, or combination thereof). The various blocks of FIG. 7 are shown with lines for the sake of conceptual clarity, and other arrangements of the described components and/or component functionality are also contemplated. For example, one may consider a presentation component such as a display device to be an I/O component. Also, processors have memory. We recognize that such is the nature of the art, and reiterate that the diagram of FIG. 7 is merely illustrative of an example computing device that can be used in connection with one or more embodiments of the present invention. Distinction is not made between such categories as "workstation," "server," "laptop," "hand-held device," etc., as all are contemplated within the scope of FIG. 7 and reference to "computing device."

Computing device 700 typically includes a variety of computer-readable media. Computer-readable media can be any available media that can be accessed by computing device 700 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 700. Computer storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 712 includes computer storage media in the form of volatile and/or nonvolatile memory. The memory may be removable, non-removable, or a combination thereof. Exemplary hardware devices include solid-state memory, hard drives, optical-disc drives, etc. Computing device 700 includes one or more processors that read data from various entities such as memory 712 or I/O components 720. Presentation component(s) 716 present data indications to a user or other device. Exemplary presentation components include a display device, speaker, printing component, vibrating component, etc.

I/O ports 718 allow computing device 700 to be logically coupled to other devices including I/O components 720, some of which may be built in. Illustrative components include a microphone, joystick, game pad, satellite dish, scanner, printer, wireless device, etc.

Additional Structural and Functional Features of Embodiments of the Technical Solution Having identified various components utilized herein, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions) can be used in addition to or instead of those shown.

Embodiments described in the paragraphs below may be combined with one or more of the specifically described alternatives. In particular, an embodiment that is claimed may contain a reference, in the alternative, to more than one other embodiment. The embodiment that is claimed may specify a further limitation of the subject matter claimed.

The subject matter of embodiments of the invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present invention are described with reference to a distributed computing environment; however the distributed computing environment depicted herein is merely exemplary. Components can be configured for performing novel aspects of embodiments, where the term "configured for" can refer to "programmed to" perform particular tasks or implement particular abstract data types using code. Further, while embodiments of the present invention may generally refer to the technical solution environment and the schematics described herein, it is understood that the techniques described may be extended to other implementation contexts.

Embodiments of the present invention have been described in relation to particular embodiments which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

What is claimed is:

1. A computerized system comprising:

one or more computer processors; and computer memory storing computer-useable instructions that, when used by the one or more computer processors, cause the one or more computer processors to perform operations, the operation comprising:

accessing a request to instantiate a secure networking engine for providing technical support services of a cloud provider computing environment for a diagnostic target of a customer computing environment, wherein the request comprises location parameters of the diagnostic target;

based on the location parameters, determining a secure networking engine site for instantiating the secure networking engine;

instantiating the secure networking engine at the secure networking engine site, the secure networking engine comprising a virtual diagnostic system and a private virtual private network (VPN) service; and based on the private VPN, causing establishment of a secure networking connection, wherein the secure networking connection via the private VPN provides a VPN gateway between the cloud provider computing environment, the virtual diagnostic system, and the customer computing environment, wherein the VPN gateway is associated with a plurality of Internet Protocol (IP) address zones comprising a zone-1 private IP address space for the customer computing environment, a zone-2 private IP address space for the virtual diagnostic system, and a zone-3 private IP address space for the cloud provider computing environment.

2. The system of claim 1, wherein the location parameters are associated with a zone-1 private Internet Protocol (IP) address space, the virtual diagnostic system is associated with a zone-2 private IP address space, and technician terminals of the cloud provider computing environment are associated with a zone-3 cloud provider private support network address space.

3. The system of claim 1, the operations further comprising:

receiving, at a debugger host machine, a first technical support instruction associated with a technician terminal of the cloud provider computing environment, wherein the virtual diagnostic system comprises a debugger host machine and a debugger proxy machine;

processing the first technical support instruction via a virtual lab virtual machine subnet associated with the virtual diagnostic system;

communicating a second technical support instruction based on the first technical instruction to the debugger proxy machine; and communicating, from the debugger proxy machine, the second technical support instruction to the customer computing environment via the secure networking connection, wherein the secure networking connection isolates the cloud provider computing environment from the customer computing environment based on communications via the virtual diagnostic system and the private VPN.

4. The system of claim 3, the operations further comprising:

receiving, at the debugger proxy machine, a response to the second technical support instruction;

communicating, from the debugger proxy machine, the response to the second technical support instruction to the debugger host machine; and communicating, from the debugger host machine, the response to the second technical support instruction to the technician terminal.

5. The system of claim 1, wherein determining the secure networking engine site is based on a network bandwidth score or cost score, wherein the secure networking engine site is selected based on at least one of the network bandwidth score or the cost score, wherein the network bandwidth score or the cost score supports ranking a plurality of candidate secure networking engine sites relative to each other such that the secure networking site is selected for instantiating the secure networking engine.

6. The system of claim 1, wherein the virtual diagnostic system comprises a private lab control machine, a debugger host machine, and a debugger proxy machine.

7. The system of claim 1, wherein the virtual diagnostic system is temporarily instantiated for a period of time associated with performing the technical support services.

8. One or more computer-storage media having computer-executable instructions embodied thereon that, when executed by a computing system having a processor and memory, cause the processor to perform operations, the operations comprising:

receiving, at a debugger host machine of a virtual diagnostic system, a first technical support instruction associated with a technician terminal of a cloud provider computing environment, wherein the virtual diagnostic system comprises a debugger host machine and a debugger proxy machine;

processing the first technical support instruction via a virtual lab virtual machine subnet associated with the virtual diagnostic system;

communicating a second technical support instruction based on the first technical instruction to the debugger proxy machine; and communicating, from the debugger proxy machine, the second technical support instruction to a customer computing environment a secure networking connection associated with a private virtual private network (VPN) between the customer computing environment and the cloud, wherein the VPN gateway is associated with a plurality of Internet Protocol (IP) address zones comprising a zone-1 private IP address space for the customer computing environment, a zone-2 private IP address space for the virtual diagnostic system, and a zone-3 private IP address space for the cloud provider computing environment.

9. The media of claim 8, wherein the first technical support instruction is received at the debugger machine via a cloud provider VPN that is a secure networking connection between the cloud provider computing environment and a secure networking engine site comprising the virtual diagnostic system.

10. The media of claim 8, wherein the virtual diagnostic system is associated with a host machine in a host machine network, the host machine is connected via a cloud provider Application Programming Interface (API) to a resource performance management system of the cloud provider computing environment.

11. The media of claim 8, wherein a private lab control machine, the debugger host machine, and the debugger machine of the virtual diagnostic machine are associated with a virtual lab virtual machine subnet that isolates communications between the cloud provider computing environment and the customer computing environment.

12. The media of claim 8, the operations further comprising:

receiving, at the debugger proxy machine, a response to the second technical support instruction;

communicating, from the debugger proxy machine, the response to the second technical support instruction to the debugger host machine; and communicating, from the debugger host machine, the response to the second technical support instruction to the technician terminal.

13. The media of claim 8, wherein the virtual diagnostic system is associated with a security networking engine site that is identified selected from a plurality of candidate security networking engine sites associated with corresponding candidate security networking engine scores.

14. The media of claim 8, wherein the virtual diagnostic system is temporarily instantiated for a period of time associated with performing the technical support services.

15. A computer-implemented method, the method comprising:

accessing a request to instantiate a secure networking engine for providing technical support services of a cloud provider computing environment for a diagnostic target of a customer computing environment, wherein the request comprises location parameters of the diagnostic target;

based on the location parameters, determining a secure networking engine site for instantiating the secure networking engine;

instantiating the secure networking engine at the secure networking engine site, the secure networking engine comprising a virtual diagnostic system and a private virtual private network (VPN) service; and based on the private VPN, causing establishment of the secure networking connection, wherein the secure networking connection via the private VPN provides a VPN gateway between the cloud provider computing environment, the virtual diagnostic system, and the customer computing environment, wherein the VPN gateway is associated with a plurality of Internet Protocol (IP) address zones comprising a zone-1 private IP address space for the customer computing environment, a zone-2 private IP address space for the virtual diagnostic system, and a zone-3 private IP address space for the cloud provider computing environment.

16. The method of claim 15, the method further comprising:

receiving, at a debugger host machine, a first technical support instruction associated with a technician terminal of the cloud provider computing environment, wherein the virtual diagnostic system comprises a debugger host machine and a debugger proxy machine;

processing the first technical support instruction via a virtual lab virtual machine subnet associated with the virtual diagnostic system;

communicating a second technical support instruction based on the first technical instruction to the debugger proxy machine; and communicating, from the debugger proxy machine, the second technical support instruction to the customer computing environment a secure networking connection associated with a private virtual private network (VPN) between the customer computing environment and the cloud, wherein the secure networking connection isolates the cloud provider computing environment from the customer computing environment based on communications via the virtual diagnostic system and the private VPN.

17. The method of claim 16, the method further comprising:

receiving, at the debugger proxy machine, a response to the second technical support instruction;

communicating, from the debugger proxy machine, the response to the second technical support instruction to the debugger host machine; and

communicating, from the debugger host machine, the response to the second technical support instruction to the technician terminal.

18. The method of claim 15, wherein the response to the second technical support instruction is received at a customer guest computing device associated with a debugging target machine in a diagnostic target in the customer computing environment.

19. The method of claim 15, wherein the diagnostic target and the secure networking engine site are associated a network bandwidth score or cost score, wherein the secure networking engine site is selected for performing technical support instructions based on at least one of the network bandwidth score and the cost score.

20. The method of claim 15, wherein the communications via the secure networking connection are available for a temporary period of time, wherein the temporary period of time corresponds to a period of time for which the virtual diagnostic system is temporarily instantiated for performing the technical support services.

* * * * *